(12) United States Patent  
Hamabashiri et al.

(10) Patent No.: US 9,041,786 B2  
(45) Date of Patent: May 26, 2015

(54) MONITORING SYSTEM AND MONITORING TERMINAL

(75) Inventors: Hideto Hamabashiri, Kyoto (JP); Satoshi Miyagawa, Kyoto (JP); Masaaki Yagi, Kyoto (JP); Shinya Yuasa, Kyoto (JP)

(73) Assignee: OMRON Corporation, Kyoto (JP)

( * ) Notice: Subject to any disclaimer, the term of this patent is extended or adjusted under 35 U.S.C. 154(b) by 901 days.

(21) Appl. No.: 13/263,649

(22) PCT Filed: Apr. 5, 2010

(86) PCT No.: PCT/JP2010/056160  
§ 371 (c)(1),  
(2), (4) Date: Oct. 7, 2011

(87) PCT Pub. No.: WO2010/116969  
PCT Pub. Date: Oct. 14, 2010

(65) Prior Publication Data  
US 2012/0019644 A1 Jan. 26, 2012

(30) Foreign Application Priority Data  
Apr. 10, 2009 (JP) ................................. 2009-096202

(51) Int. Cl.  
*H04N 7/18* (2006.01)  
*G06T 7/20* (2006.01)  
*G08B 13/196* (2006.01)

(52) U.S. Cl.  
CPC ..... *G06T 7/2093* (2013.01); *G06T 2207/10016* (2013.01); *G06T 2207/30232* (2013.01); *G08B 13/19608* (2013.01); *H04N 7/181* (2013.01)

(58) Field of Classification Search  
CPC . G06T 7/2093; H04N 7/181; G08B 13/19608  
See application file for complete search history.

(56) References Cited

U.S. PATENT DOCUMENTS 7,450,735 B1 11/2008 Shah et al.  
2007/0237357 A1 10/2007 Low

FOREIGN PATENT DOCUMENTS

EP 2117232 A1 11/2009  
JP 2004-274309 A 9/2004  
(Continued)

OTHER PUBLICATIONS

D. Makris et al., "Bridging the Gaps between Cameras," Proceedings of the 2004 IEEE Computer Society Conference on Computer Vision and Pattern Recognition (CVPR'04), Jun. 27, 2004, vol. 2 (6 pages).

(Continued)

*Primary Examiner* — Sath V Perungavoor  
*Assistant Examiner* — Kate Luo  
(74) *Attorney, Agent, or Firm* — Osha Liang LLP

(57) ABSTRACT

A monitoring system has a plurality of monitoring terminals communicably connected to each other. Each monitoring terminal has an imaging portion for imaging a monitoring area allocated to an own-terminal, a tracing portion for processing an imaged image of the imaging portion and tracing a target person traveling in the monitoring area, a tracing information creation portion for creating tracing information associating the target person traced by the tracing portion with tracing start time, tracing stop time, and characteristic information of the target person, a tracing information storage portion for storing the tracing information created by the tracing information creation portion, and a tracing information notification portion for notifying the tracing information created by the tracing information creation portion to the other monitoring terminals.

8 Claims, 16 Drawing Sheets

(56) References Cited

FOREIGN PATENT DOCUMENTS

| JP | 2006-146378 A | 6/2006 |
|----|---------------|--------|
| JP | 2008-219570 A | 9/2008 |
| JP | 2009-017416 A | 1/2009 |

OTHER PUBLICATIONS

O. Javed et al, "Modeling inter-camera space-time and appearance relationships for tracking across non-overlapping views," Computer Vision and Image Understanding, Jan. 10, 2008, vol. 109, No. 2, pp. 146-162, 17 pages.

Extended European Search Report for Application No. 10761668.2, mailed on Aug. 2, 2012 (8 pages).
Patent Abstracts of Japan, Publication No. 2009-017416, dated Jan. 22, 2009, 1 page.
Patent Abstracts of Japan, Publication No. 2008-219570, ated Sep. 18, 2009, 1 page.
Patent Abstracts of Japan, Publication No. 2006-146378, dated Jun. 8, 2006, 1 page.
Patent Abstracts of Japan, Publication No. 2004-274309, dated Sep. 30, 2004, 1 page.
English translation of International Search Report issued in PCT/JP2010/056160, mailed on Jul. 6, 2010, 2 pages.
Written Opinion issued in PCT/JP2010/056160, mailed on Jul. 6, 2010, 2 pages.

Fig. 5

TRAVEL TIME DISTRIBUTION DATA

|  | 10~30(s) | 30~50(s) | 50~70(s) | 70~90(s) |
|---|---|---|---|---|
| OWN-TERMINAL 1a | 0 | 0 | 0 | 0 |
| MONITORING CAMERA TERMINAL 1b | 0 | 0 | 0 | 0 |
| MONITORING CAMERA TERMINAL 1c | 0 | 0 | 0 | 0 |
| MONITORING CAMERA TERMINAL 1d | 0 | 0 | 0 | 0 |
| MONITORING CAMERA TERMINAL 1e | 0 | 0 | 0 | 0 |

TRACING INFORMATION

| ID | TRACING START TIME | TRACING STOP TIME | FACE IMAGE |
|---|---|---|---|
| 1a | 10:03:45 | 10:04:25 |  |

Fig. 7

TRAVEL TIME DISTRIBUTION DATA

|  |  | 10~30(s) | 30~50(s) | 50~70(s) | 70~90(s) |
|---|---|---|---|---|---|
| OWN-TERMINAL | 1a | 1 | 1 | 0 | 0 |
| MONITORING CAMERA TERMINAL | 1b | 0 | 0 | 0 | 0 |
| MONITORING CAMERA TERMINAL | 1c | 0 | 0 | 0 | 0 |
| MONITORING CAMERA TERMINAL | 1d | 0 | 0 | 0 | 0 |
| MONITORING CAMERA TERMINAL | 1e | 0 | 0 | 0 | 0 |

Fig. 8

TRAVEL TIME DISTRIBUTION DATA

|  | | 10~30(s) | 30~50(s) | 50~70(s) | 70~90(s) |
|---|---|---|---|---|---|
| OWN-TERMINAL | 1a | 1 | 1 | 0 | 0 |
| MONITORING CAMERA TERMINAL | 1b | 0 | 1 | 1 | 1 |
| MONITORING CAMERA TERMINAL | 1c | 0 | 0 | 0 | 0 |
| MONITORING CAMERA TERMINAL | 1d | 0 | 0 | 0 | 0 |
| MONITORING CAMERA TERMINAL | 1e | 0 | 0 | 0 | 0 |

Fig. 11

TRAVEL TIME DISTRIBUTION DATA

|  |  | 10 ~ 30(s) | 30 ~ 50(s) | 50 ~ 70(s) | 70 ~ 90(s) |
|---|---|---|---|---|---|
| OWN-TERMINAL | 1a | 54 | 17 | 12 | 5 |
| MONITORING CAMERA TERMINAL | 1b | 6 | 9 | 13 | 11 |
| MONITORING CAMERA TERMINAL | 1c | 15 | 19 | 3 | 3 |
| MONITORING CAMERA TERMINAL | 1d | 3 | 5 | 8 | 0 |
| MONITORING CAMERA TERMINAL | 1e | 0 | 0 | 5 | 8 |

MONITORING SYSTEM AND MONITORING TERMINAL

BACKGROUND

1. Technical Field

This invention relates to a monitoring system and a monitoring terminal applicable to the monitoring system that detect and monitor a suspicious person in public places and issue a response instruction for the detected suspicious person to a guard.

2. Background Art

Conventionally, a monitoring system is used in public places, in which a plurality of monitoring camera terminals are used to detect a suspicious person and monitor (trace) the detected suspicious person. The suspicious person is a person having to be monitored (a monitoring target person), including not only a person having suspicious behavior but a person on the wanted list or the like. The monitoring system displays the imaged image of each monitoring camera terminal on a display device installed in a monitoring room so that the suspicious person can be monitored in the monitoring room.

Further, in order to reduce the burden of a observer that monitors the screen of the display device, the correspondence between the imaging areas (the monitoring areas) of the monitoring camera terminals is used to automatically change, depending on the travel of the suspicious person, the monitoring camera terminal for displaying the imaged image (see Japanese published unexamined application No. 2008-219570). Further, in Japanese published unexamined application No. 2008-219570, each monitoring camera terminal extracts the characteristics of a mobile object, and the time difference in which highly correlated characteristics are detected is used to estimate the correspondence (coupling related information) between the monitoring camera terminals.

Patent Document 1: Japanese Patent Laid-Open Publication No. 2008-219570

SUMMARY

Unfortunately, conventional monitoring systems hardly take into account the response instruction for the detected suspicious person, which is to be issued to a guard. In short, if conventional monitoring systems detect a suspicious person, they only display the imaged image of the suspicious person on the display device in the monitoring room while tracing the detected suspicious person. The response instruction for the detected suspicious person has been issued to the guard by the observer that monitors the imaged image of the suspicious person in the monitoring room.

According to one or more embodiments of the present invention, the observer issues the response instruction to the guard who can most rapidly come into contact with the suspicious person. Thus, in order for the observer to quickly and appropriately issue the response instruction for the detected suspicious person, the observer always has to understand the guard positions as well as to understand the travel time between the guard positions and the suspicious person position or the like. This increases the burden on the observer and sometimes results in failing to catch the detected suspicious person due to the delay of the response instruction to the guard from the observer or the like.

One or more embodiments of the present invention provides a monitoring system in which each monitoring terminal may accurately generate, for each of other monitoring terminals, travel time distribution data indicating a travel time from the own-terminal monitoring area, and a monitoring terminal applicable to the monitoring system.

One or more embodiments of the present invention provides a monitoring system that uses the above travel time distribution data to quickly and appropriately issue the response instruction for a detected suspicious person.

According to one or more embodiments of the present invention, a monitoring system may be configured as follows.

The monitoring system is a so-called sensor network system, which includes a plurality of monitoring terminals communicably connected in a wireless or wired manner.

Each monitoring terminal includes an imaging means, a tracing means, a tracing information creation means, a tracing information storage means, a tracing information notification means, and a travel time distribution data generation means. The imaging means images a monitoring area allocated to an own-terminal. The tracing means processes an imaged image of the imaging means, and traces a target person traveling in the monitoring area. The tracing information creation means creates tracing information associating the target person traced by the tracing means with tracing start time, tracing stop time, and characteristic information of the target person. The tracing information storage means stores the tracing information created by the tracing information creation means. The tracing information notification means notifies the tracing information to other monitoring terminals. Further, the travel time distribution data generation means generates travel time distribution data that aggregates distributions of the target person's travel time from the own-terminal monitoring area to the monitoring area of each monitoring terminal. The travel time distribution data generation means generates travel time distribution data in the following process.

First, for tracing information notified from each of the other monitoring terminals, the characteristic information of the target person included in the notified tracing information is used to search whether the tracing information storage means stores the tracing information of a person who is relevant to the target person. Specifically, it is determined whether the notified tracing information of the process target is related to the target person traced by the own-terminal tracing means. The travel time distribution data generation means calculates, if the tracing information of the relevant target person is searched out, i.e., the tracing information of the process target is related to the target person traced by the own-terminal tracing means, a first travel time as a time difference between the tracing stop time of the current searched-out tracing information and the tracing start time of the notified tracing information, and a second travel time as a time difference between the tracing start time of the current searched-out tracing information and the tracing stop time of the notified tracing information. The first travel time is the shortest time between the timing when the target person is detected in the own-terminal monitoring area and the timing when the target person is detected in the monitoring area of the monitoring terminal that notifies the tracing information of the process target. The second travel time is the longest time between the timing when the target person is detected in the own-terminal monitoring area and the timing when the target person is detected in the monitoring area of the monitoring terminal that notifies the tracing information of the process target. The travel time distribution data generation means generates travel time distribution data that aggregates distributions of the time width from the first travel time to the second travel time calculated for each tracing information notified by each of the other monitoring terminals.

The travel time distribution data has higher accuracy as more target persons are aggregated. Note that the target person may be appropriately selected from the persons that enter the own-terminal monitoring area.

Further, each monitoring terminal may be adapted to instruct, if it detects a monitoring target person (such as a suspicious person), a registrant (such as a guard) of the response for the detected monitoring target person. For example, there is provided a determination portion for determining the presence or absence of the monitoring target person in the own-terminal monitoring area. There is also provided a registrant position detection portion for detecting a position of a registrant (such as a guard) having a personal digital assistance. The determination means may be adapted, for example, to determine for any person in the imaged image, whether an input specifying the person as a suspicious person is received from an external device. The determination means may also be adapted to store the facial feature amount of each monitoring target person, and verify the facial feature amount of the person in the imaged image with the facial feature amount of the stored monitoring target person to make the determination. Further, the registrant position detection portion may be adapted, for example, to store the facial feature amount of each registrant, and verify the facial feature amount of the person in the imaged image with the facial feature amount of the stored monitoring target person to detect the registrant in the monitoring area. In this case, the monitoring terminal may have a function of querying, if it detects a suspicious person, the other monitoring terminals about the presence or absence of the registrant. The presence of the registrant may thus be sensed in the own-terminal monitoring area as well as in the other monitoring terminal monitoring areas.

Then there may be provided a response instruction output portion that outputs a response instruction for the monitoring target person in the own-terminal monitoring area to the personal digital assistance of the registrant at a position having the shortest travel time from the own-terminal monitoring area or the registrant at a position having the shortest travel time in which the registrant comes to the own-terminal monitoring area, the travel time being estimated using the travel time distribution data created by the travel time distribution data creation portion. The response instruction for the detected monitoring target person may thus be quickly and appropriately issued.

According to one or more embodiments of the present invention, each monitoring terminal may accurately generate, for each of the other monitoring terminals, travel time distribution data indicating a travel time from the own-terminal monitoring area. The travel time distribution data may be used to quickly and appropriately issue the response instruction for the detected suspicious person.

BRIEF DESCRIPTION OF THE DRAWINGS

FIG. 5 shows an initial value of travel time distribution data;
FIG. 7 illustrates a travel time distribution data generation process;
FIG. 8 illustrates the travel time distribution data generation process;
FIG. 11 shows travel time distribution data.

DETAILED DESCRIPTION

A monitoring system according to embodiments of the present invention will be described below. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
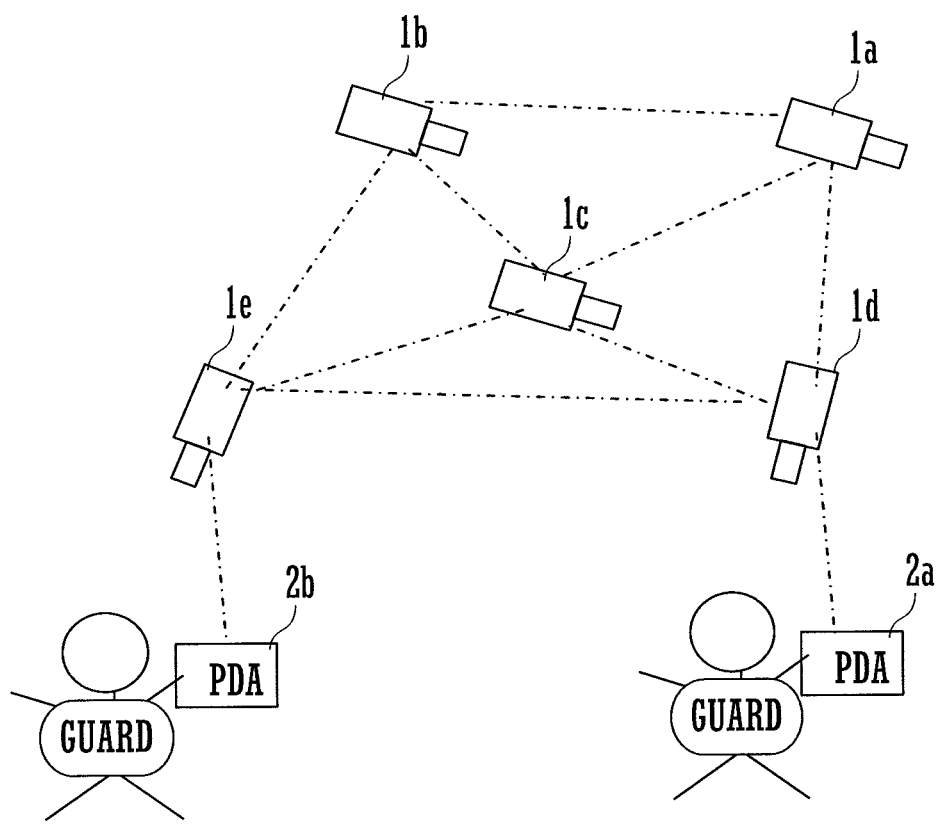
FIG. 1 is a schematic diagram of the configuration of a monitoring system.

FIG. 1 is a schematic diagram of the configuration of the monitoring system. The monitoring system includes a plurality of monitoring camera terminal 1 and a plurality of personal digital assistances (handheld devices) 2 (hereinafter referred to as PDAs 2). The number of monitoring camera terminals 1 and PDAs 2 may depend on the size of the monitoring target area monitored by the monitoring system and on the number of guards. FIG. 1 shows 5 monitoring camera terminals 1 (1a to 1e) and 2 PDAs 2 (2a and 2b). Each monitoring camera terminal 1 is attached to a position for imaging the monitoring area allocated to the own-terminal. The monitoring camera terminals 1a to 1e construct an ad-hoc wireless network system. Each monitoring camera terminal 1 directly communicates with a terminal in the own-terminal wireless communication area, and communicates with a terminal not in the own-terminal wireless communication area via another terminal. The PDA 2 is a terminal carried by a guard who is to respond to a suspicious person or the like. The guard patrols the monitoring target area while carrying the PDA 2. Each monitoring camera terminal 1 may wirelessly communicate with the PDA 2 in the own-terminal monitoring area.

Note that the monitoring camera terminals 1a to 1e may communicate with each other not in a wireless manner but in a wired manner.

Figure 2:
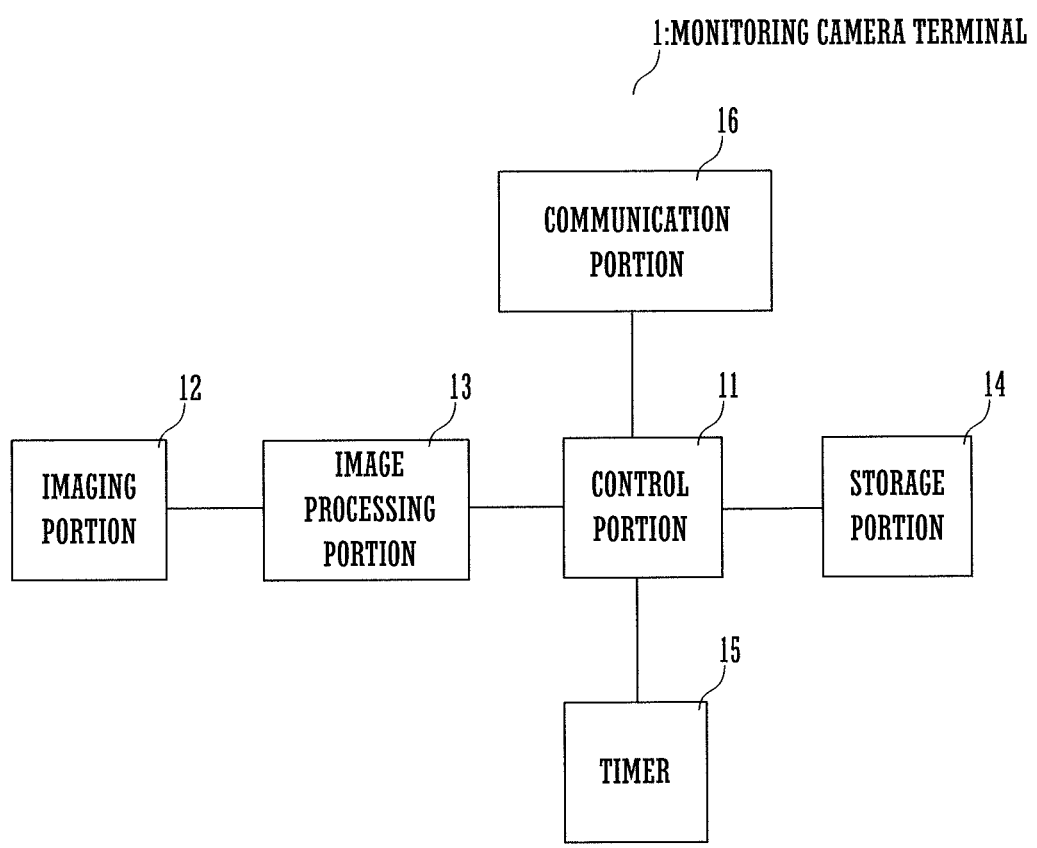
FIG. 2 shows the configuration of the main portion of the monitoring camera terminal.

FIG. 2 illustrates the configuration of the main portion of the monitoring camera terminal. The monitoring camera terminal 1 includes a control portion 11, an imaging portion 12, an image processing portion 13, a storage portion 14, a timer 15, and a communication portion 16. The control portion 11 controls the operation of each portion of the monitoring camera terminal 1 main portion. The imaging portion 12 has a CCD camera, which images a monitoring target area allocated to the own-terminal. The imaging portion 12 inputs imaged images at some ten frames (for example, 30 frames) per second to the image processing portion 13. The image processing portion 13 processes the imaged image input from the imaging portion 12 and recognizes the imaged person or the like. The storage portion 14 stores information such as an operation program for operating the monitoring camera terminal 1 main portion, tracing information, travel time distribution data, monitoring target person information, registrant information, and network topology related to the connection of the monitoring camera terminal 1 in the monitoring system, as described below. The timer 15 clocks the current time. The communication portion 16 wirelessly communicates with the other monitoring camera terminals 1 and the PDAs 2 in the network.

Figure 3:
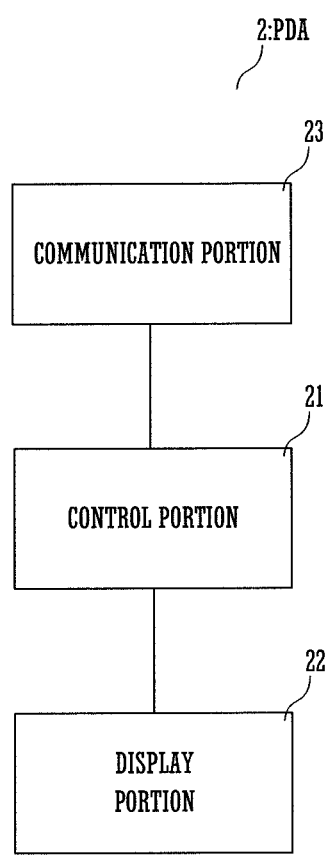
FIG. 3 shows the configuration of the main portion of a PDA.

FIG. 3 illustrates the configuration of the main portion of the PDA. The PDA 2 includes a control portion 21, a display portion 22, and a communication portion 23. The control portion 21 controls the operation of each portion of the PDA 2 main portion. The display portion 22 displays a travel instruction and an imaged image transmitted from the monitoring camera terminal 1. The communication portion 23 wirelessly communicates with the monitoring camera terminal 1.

Each monitoring camera terminal 1 has a function of generating travel time distribution data indicating the travel time from the own-terminal monitoring area to each of the other monitoring camera terminals 1. Each monitoring camera terminal 1 also has a function of determining the presence or absence of a suspicious person (a monitoring target person according to one or more embodiments of the present invention) in the own-terminal monitoring area. Each monitoring camera terminal 1 also has a function of instructing, if a suspicious person is in the own-terminal monitoring area, the response for the suspicious person to a guard (a registrant according to one or more embodiments of the present invention) having the PDA 2.

Figure 4:
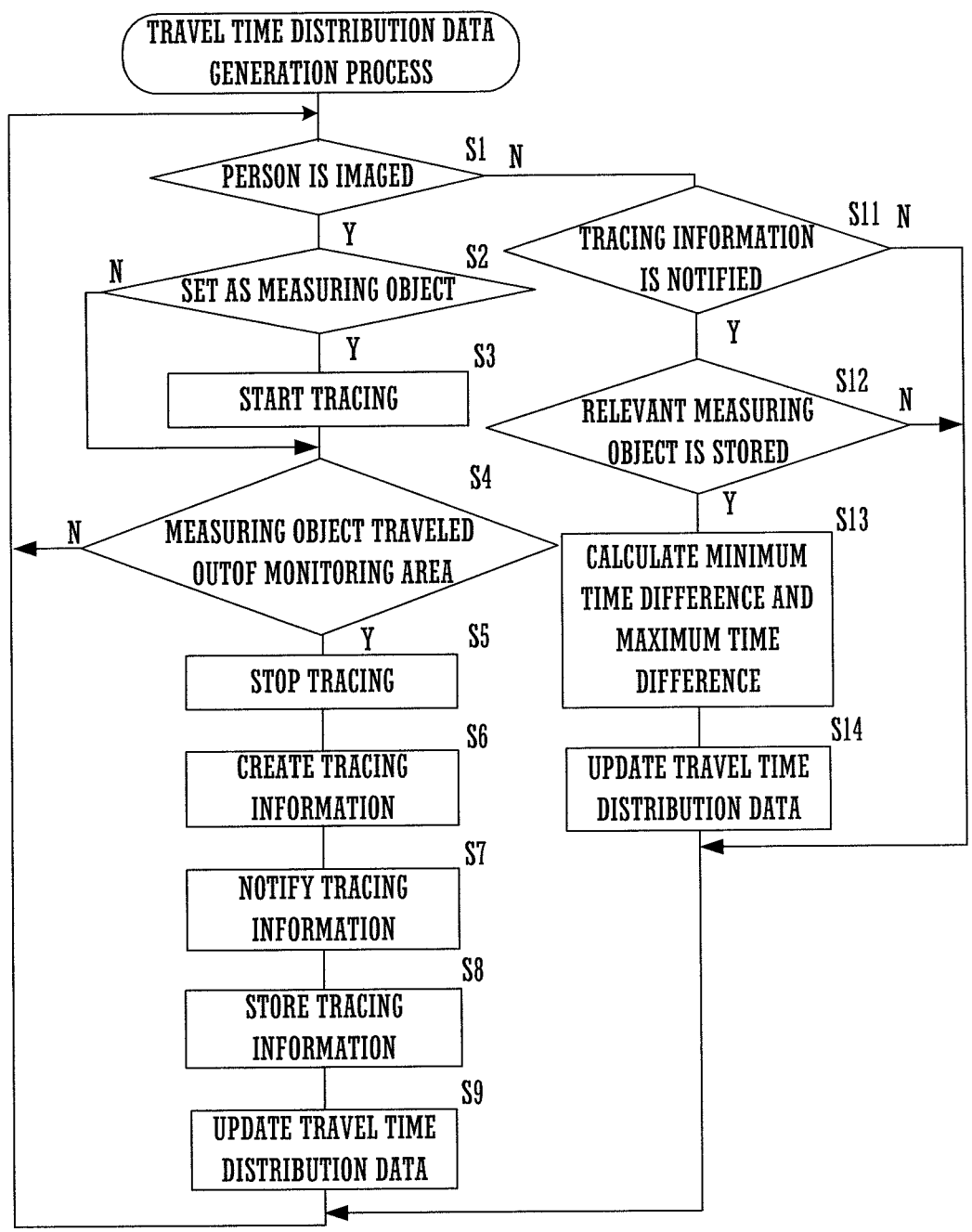
FIG. 4 is a flowchart of a travel time distribution data creation process.

First, the function of generating travel time distribution data will be described. The travel time distribution data may be generated in a certain period. According to one or more embodiments of the present invention, the travel time distribution data is always generated in the background because more measuring objects may provide higher accuracy. Travel time distribution data is stored in the storage portion 14. FIG. 4 is a flowchart of the travel time distribution data generation process. The following description is given with respect to the monitoring camera terminal 1a by way of example. FIG. 5 illustrates an initial value of travel time distribution data. With reference to FIG. 5, the travel time distribution data is table data that registers, for each monitoring camera terminal 1 including the own-terminal, element values in predetermined time divisions (FIG. 5 shows 4 time divisions of 10 s to 30 s, 30 s to 50 s, 50 s to 70 s, and 70 s to 90 s). The travel time distribution data generation process is a process that updates the above element values. FIG. 5 shows initial values in which all element values are "0."

In the monitoring camera terminal 1a, the image processing portion 13 processes each frame's imaged image of the monitoring area input from the imaging portion 12, and determines the presence or absence of an imaged person (S1). The monitoring camera terminal 1a determines whether the imaged person, if any, is to be set as a measuring object (a target person according to one or more embodiments of the present invention) (S2). It is determined in S2 that a person already set as the measuring object and a person unsuitable to be set as the measuring object for some reason (including, infants and children) are not to be set as the measuring object. If a person is newly set as the measuring object in S2, the monitoring camera terminal 1a starts tracing of the person. In S3, the tracing start time of the person is set to the time currently clocked by the timer 15.

The monitoring camera terminal 1a determines whether the person being traced (the person already set as the measuring object) has traveled out of the own-terminal monitoring area (S4). If the monitoring camera terminal 1a determines that the person being traced has traveled out of the own-terminal monitoring area, it stops the tracing of the person (S5). It is determined in S4 that the person has traveled out of the monitoring area if the person being traced is not imaged in the current processed imaged image from the imaging portion 12. In S5, the tracing stop time of the person is set to the time currently clocked by the timer 15.

Figure 6:
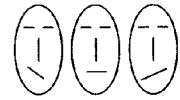
FIG. 6 shows tracing information.

The monitoring camera terminal 1a creates tracing information about the person of which it stops the tracing in S5 (S6). With reference to FIG. 6, the tracing information associates the person with the ID of the own-terminal (here, the ID is 1a), the tracing start time (10:03:45), the tracing stop time (10:04:25), and the face image of the measuring object acquired during tracing. The step of S6 corresponds to the tracing information creation means according to one or more embodiments of the present invention. The monitoring camera terminal 1a notifies the tracing information created in S6 to the other monitoring camera terminals 1b to 1e (S7). The step of S7 corresponds to the tracing information notification means according to one or more embodiments of the present invention.

Note that although in the above description the face image of the measuring object is included in the tracing information, the face image may be replaced with any information that may identify a person, including characteristics such as a body type and clothes.

The monitoring camera terminal 1a stores the tracing information created in S6 in the storage portion 14 (S8). Further, the monitoring camera terminal 1a uses the current tracing information stored in the storage portion 14 to update travel time distribution data (S9), and then returns to S1. In S9, the tracing information of the current person of which the tracing is completed is used to update the element values indicating the dwell time of the person in the own-terminal monitoring area. Specifically, the monitoring camera terminal 1a calculates the elapsed time (40 s) from the tracing start time (10:03:45) to the tracing stop time (10:04:25) as the dwell time. Then, in travel time distribution data, the monitoring camera terminal 1a increments by 1 each element value of all time divisions (here, 10 to 30 s and 30 to 50 s) including an amount of time equal to or less than the calculated dwell time (see FIG. 7).

Further, if the monitoring camera terminal 1a is notified of tracing information from the other monitoring camera terminals 1b to 1e (S11), it uses the face image of the measuring object included in the current notified tracing information to determine whether the storage portion 14 stores the tracing information of the relevant measuring object (S12). As described above, the storage portion 14 stores the tracing information of the measuring object of which the travel is traced in the monitoring area of the own-terminal. If the storage portion 14 does not store the tracing information of the relevant measuring object, then the monitoring camera terminal 1a returns to S1.

If the monitoring camera terminal 1a stores the tracing information of the relevant measuring object in the storage portion 14, it calculates two time differences for the measuring object (S13). The first is the time difference between the tracing stop time in the own-terminal and the tracing start time included in the current notified tracing information (hereinafter referred to as the minimum time difference). The second is the time difference between the detection starting time in the own-terminal and the detection stop time included in the current notified tracing information (hereinafter referred to as the maximum time difference). The minimum time difference corresponds to the first travel time according to one or more embodiments of the present invention. The maximum time difference corresponds to the second travel time according to one or more embodiments of the present invention. The monitoring camera terminal 1a uses the minimum time difference and the maximum time difference calculated in S13 to update the travel time distribution data (S14), and then returns to S1.

In S14, for the current other monitoring camera terminals 1b to 1e that have notified the tracing information, the element values indicating the travel time from the own-terminal monitoring area are updated. If, for example, for the measuring object of the tracing information of the tracing start time (10:03:45) and the tracing stop time (10:04:25) stored by the own-terminal, the monitoring camera terminal 1b notifies of the tracing information of the tracing start time (10:05:10) and the tracing stop time (10:06:00), the calculated minimum time difference is 45 s and the maximum time difference is 135 s. For the current monitoring camera terminal 1b that has notified the tracing information, the monitoring camera terminal 1a increments by 1 each element value of all time divisions (here, 30 to 50 s, 50 to 70 s, and 70 to 90 s) including the amount of time between the current calculated minimum time difference and the maximum time difference (see FIG. 8).

The monitoring camera terminal 1a may repeat the process in FIG. 4 to accurately generate travel time distribution data. In this travel time distribution data, for the dwell time of a person in the own-terminal monitoring area, the time width distributions are aggregated (each element value of the time division including the amount of time equal to or less than the dwell time is incremented by 1). A time division having a shorter corresponding time thus has a larger element value. For the travel time of a person from the own-terminal monitoring area to each monitoring area of the other monitoring camera terminals 1b to 1e, the time width distributions of the minimum time difference to the maximum time difference are aggregated. A time division corresponding to the average travel time thus has a larger element value.

Note that the tracing information stored in the storage portion 14 may be deleted after a certain amount of time, for example 2 to 3 min, elapsed from the detection stop time. This may limit the total amount of tracing information to be verified with the tracing information notified from the other monitoring camera terminals 1b to 1e and also limit the storage capacity of the storage portion 14.

Although the above description uses the monitoring camera terminal 1a as an example to describe the generation process of travel time distribution data, the other monitoring camera terminals 1b to 1e also generate travel time distribution data and store it in the storage portion 14.

Figure 9:
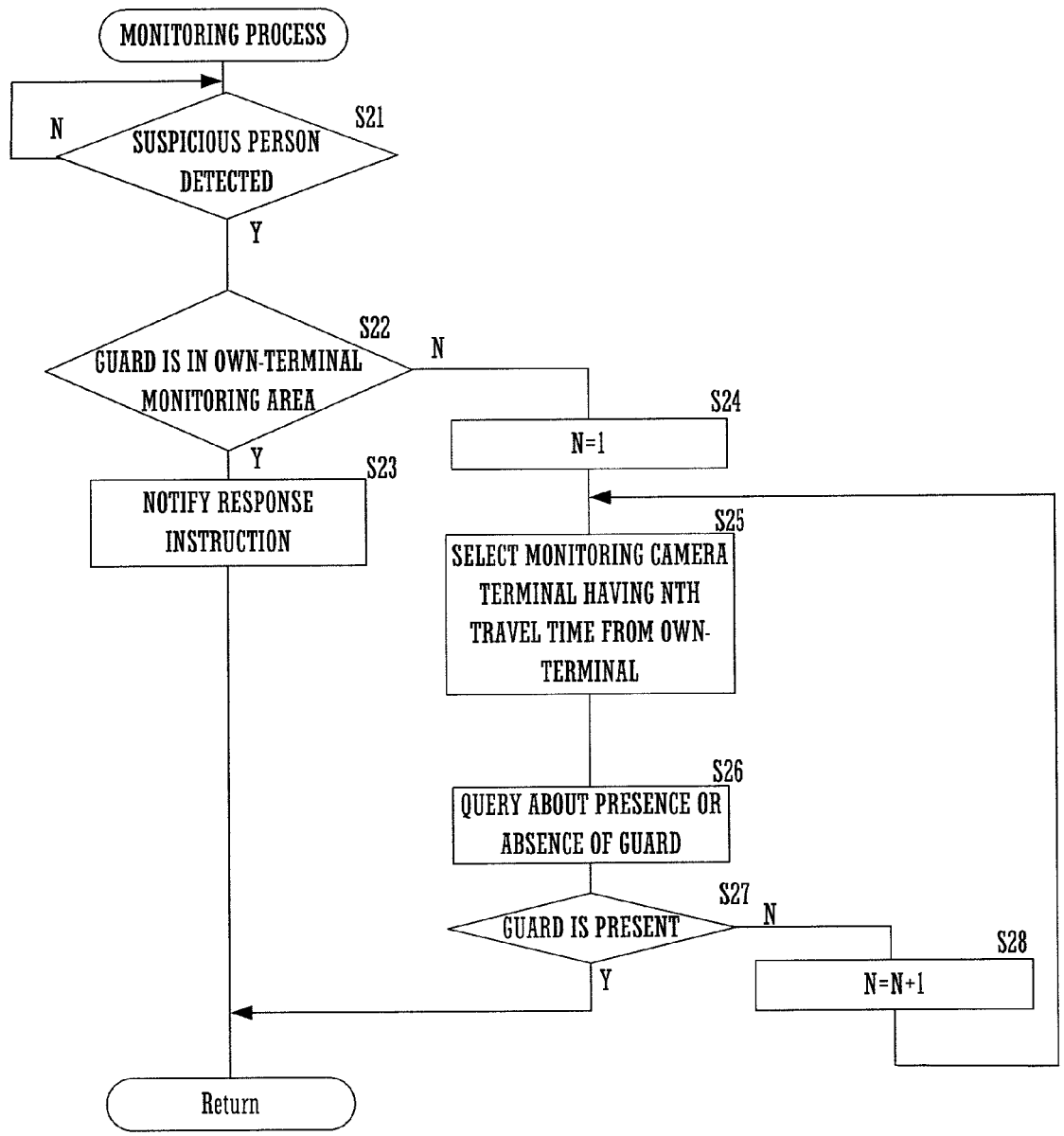
FIG. 9 is a flowchart of a monitoring process.

A description is now given of a monitoring process in this monitoring system for detecting a suspicious person and instructing a guard about the response to the suspicious person. The guard has the PDA 2. Further, each monitoring camera terminal 1 stores travel time distribution data generated by the above travel time distribution data generation process in the storage portion 14. FIG. 9 is a flowchart of the monitoring process. Each monitoring camera terminal 1 performs the monitoring process in FIG. 9.

The monitoring camera terminal 1 determines whether a suspicious person is present in the own-terminal monitoring area (S21). In S21, for example, the image processing portion 13 processes the imaged image of the imaging portion 12 and analyzes the behavior of the imaged person. If there is a person having suspicious behavior, the person is determined as a suspicious person.

Further, as the monitoring target person information, the facial feature amount of persons on the blacklist is stored in the storage portion 14. The monitoring camera terminal 1 verifies, in the image processing portion 13, the characteristic amount of the face image of the person imaged by the imaging portion 12 with the facial feature amount of each person on the blacklist registered in the monitoring target person information. The monitoring camera terminal 1 thus determines whether any person on the blacklist is imaged. If any person on the blacklist is imaged, the person on the blacklist is detected as a suspicious person.

Further, a suspicious person may be detected using other equipment and sensor or the like and be notified to the monitoring camera terminal 1. Further, the observer that monitors the imaged image of each monitoring camera terminal 1 may detect the suspicious person, and may input to notify the monitoring camera terminal 1 if the observer detects a suspicious person. In this case, if the monitoring camera terminal 1 is notified of suspicious person detection, it determines that the suspicious person is in the own-terminal monitoring area.

If the monitoring camera terminal 1 determines that a suspicious person is present in the monitoring area, then it determines whether a guard is present in the own-terminal monitoring area (S22). Each monitoring camera terminal 1 stores the registrant information associating the ID of each PDA 2 with the facial feature amount of the guard having the PDA 2 in the storage portion 14. The monitoring camera terminal 1 verifies, in the image processing portion 13, the characteristic amount of the face image of the person in the monitoring area imaged by the imaging portion 12 with the facial feature amount of each guard registered in the registrant information. The monitoring camera terminal 1 thus determines the presence or absence of a guard in the own-terminal monitoring area.

Note that the monitoring camera terminal 1 may be adapted to acquire the position of the PDA 2 through wireless communication with the PDA 2, and in this case, the PDA 2 has to be provided with a position sense function including the GPS.

If the monitoring camera terminal 1 determines that a guard is present in the own-terminal monitoring area in S22, it notifies the PDA 2 of the guard of the response instruction (S23). The response instruction includes information of the face image of the current detected suspicious person and the monitoring area in which the suspicious person is present (in this case, the monitoring area in which the guard is present). The PDA 2 displays the response instruction notified to the own-terminal on the display portion 22. The PDA 2 may have a function of announcing, by voice or the like, receipt of the response instruction notification. If, therefore, the monitoring camera terminal 1 detects a suspicious person and has a guard in the own-terminal monitoring area, it may quickly and appropriately issue the response instruction to the guard.

If the monitoring camera terminal 1 determines that a guard is not present in the monitoring area of the own-terminal in S22, then it sets N to 1 (S24). The number N is a parameter used to select other monitoring camera terminals 1 that notify the detection of a suspicious person. First, the monitoring camera terminal 1 selects, among other monitoring camera terminals 1, the monitoring camera terminal 1 allocated with the monitoring area having the Nth shortest travel time from the own-terminal monitoring area (S25). In S25, travel time distribution data stored in the storage portion 14 is used to select other monitoring camera terminals 1.

Figure 10:
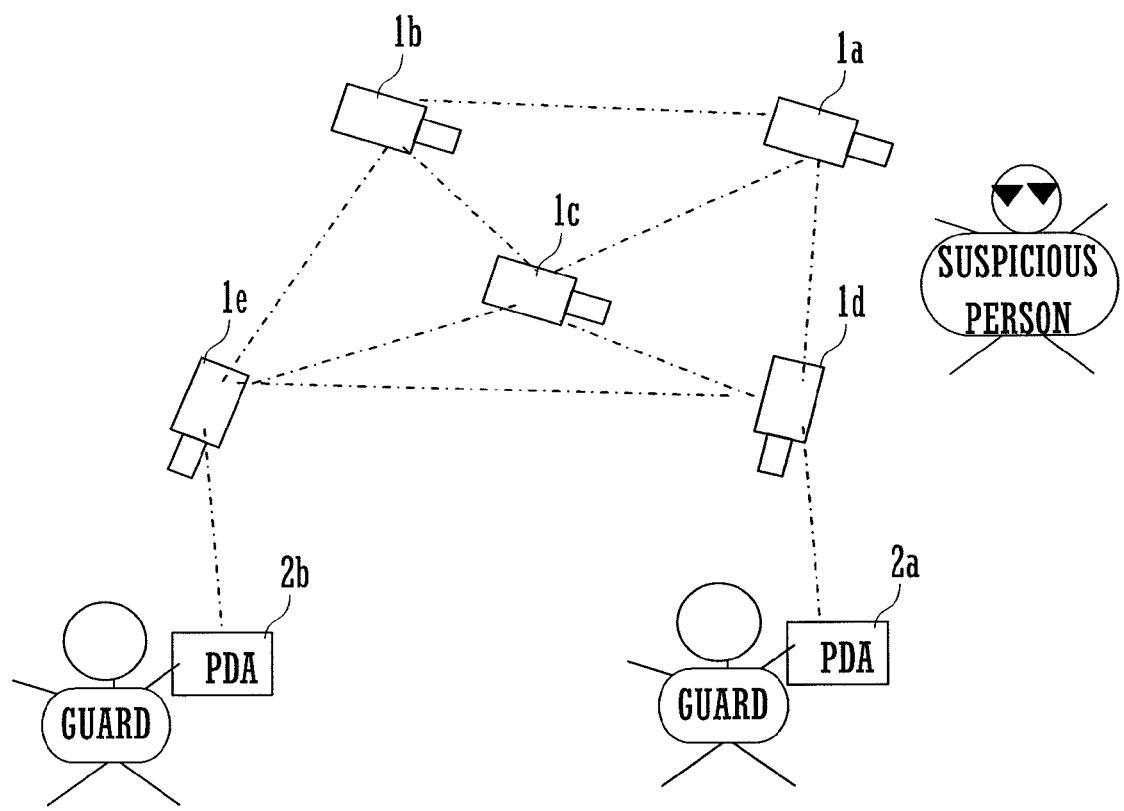
FIG. 10 illustrates the monitoring process.

As described above, travel time distribution data is data indicating the travel time from the own-terminal monitoring area to the monitoring area of the other monitoring camera terminal 1. With reference to FIG. 10, it is assumed here, for example, that the monitoring camera terminal 1a detects the suspicious person in the monitoring area when guards having the PDA 2 are present in the monitoring area of the monitoring camera terminal 1d and the monitoring area of the monitoring camera terminal 1e. It is also assumed that the monitoring camera terminal 1a stores the travel time distribution data shown in FIG. 11 in the storage portion 14. The travel time distribution data includes a plurality of time divisions for each of the other monitoring camera terminals 1. The monitoring camera terminal 1a determines, for each of the other monitoring camera terminals 1, the time division having the maximum element value as the travel time from the own-terminal monitoring area to that monitoring camera terminal 1. FIG. 11 shows an example where the monitoring camera terminal 1a has a travel time of 50 to 70 s to the monitoring area of the monitoring camera terminal 1b, a travel time of 10 to 30 s to the monitoring area of the monitoring camera terminal 1c, a travel time of 30 to 50 s to the monitoring area of the monitoring camera terminal 1d, and a travel time of 70 to 90 s to the monitoring area of the monitoring camera terminal 1e. Therefore, the monitoring camera terminal 1a determines that the monitoring camera terminal 1c is the terminal allocated with the monitoring area having the shortest travel time from the own-terminal monitoring area. The following is also determined. The monitoring camera terminal 1d is the terminal allocated with the monitoring area having the second shortest travel time from the own-terminal monitoring area. The monitoring camera terminal 1b is the terminal allocated with the monitoring area having the third shortest travel time from the own-terminal monitoring area. The monitoring camera terminal 1e is the terminal allocated with the monitoring area having the fourth shortest travel time from the own-terminal monitoring area.

The monitoring camera terminal 1 queries each of the other monitoring camera terminals 1 selected in S25 about the presence or absence of a guard in the monitoring area of that terminal (S26). The query includes the own-terminal ID and the face image of the current detected suspicious person.

Figure 12:
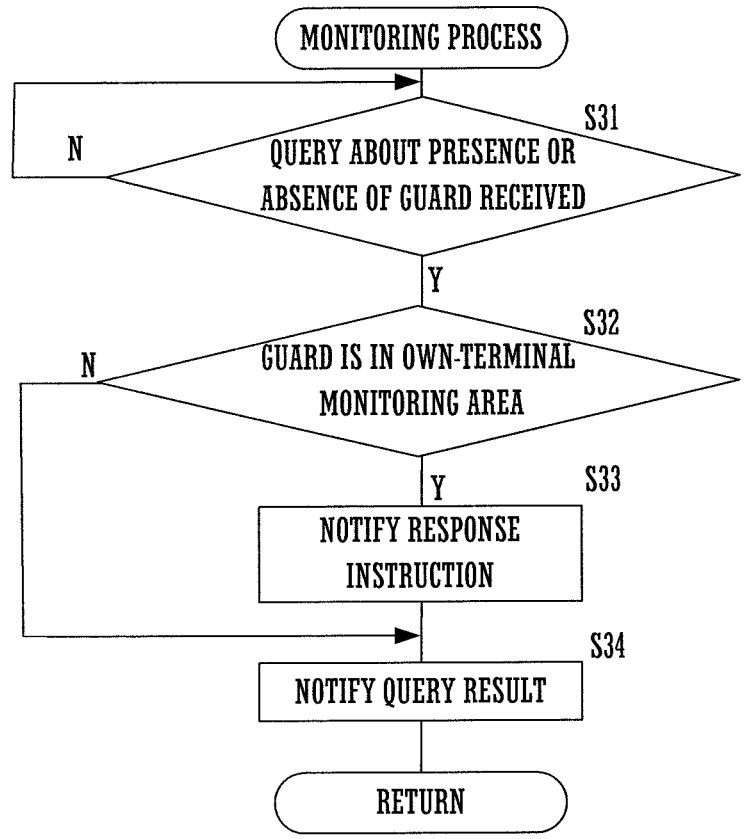
FIG. 12 is a flowchart of the monitoring process.

FIG. 12 is a flowchart of the operation of the monitoring camera terminal having received the query in S26. This process is performed in parallel with the monitoring process in FIG. 9. If the monitoring camera terminal 1 receives the query in S26 (S31), it determines whether a guard is present in the own-terminal monitoring area (S31 and S32). Each monitoring camera terminal 1 stores registrant information associating a guard face image with the ID of the PDA 2 of the guard. In S32, like the above S22, the monitoring camera terminal 1 verifies, in the image processing portion 13, the characteristic amount of the face image of the person in the monitoring area imaged by the imaging portion 12 with the facial feature amount of each guard registered in the registrant information. The monitoring camera terminal 1 thus determines the presence or absence of a guard in the own-terminal monitoring area.

If the monitoring camera terminal 1 determines that a guard is present in the own-terminal monitoring area in S32, it transmits the response instruction to the PDA 2 of the guard (S33). The response instruction includes information of the face image of the suspicious person and the monitoring area in which the suspicious person is present (here, the ID of the current monitoring camera terminal 1a that has transmitted the query) that are included in the query received in S31. The monitoring camera terminal 1 then transmits the determination on the presence or absence of a guard in the own-terminal monitoring area (S34) to the current monitoring camera terminal 1 having transmitted the query.

Note that if the monitoring camera terminal 1 determines in S32 that no guard is present in the own-terminal monitoring area, it does not perform the process in S33.

If it is determined for the query in S26 that no guard is present (S27), then the current monitoring camera terminal 1 having detected the suspicious person increments N by 1 (S28), and performs the process in and after S25. If it is determined for the query in S26 that a guard is present (S27), the monitoring camera terminal 1 stops the process.

FIG. 10 and FIG. 11 show a situation in which the monitoring camera terminal 1 having detected the suspicious person queries the monitoring camera terminal 1c about whether a guard is present in the monitoring area. After the monitoring camera terminal 1 receives from the monitoring camera terminal 1c a reply indicating that a guard is not present, it issues the query again to the monitoring camera terminal 1d in S26. The monitoring camera terminal 1d detects a guard in the own-terminal monitoring area, and notifies the PDA 2a of the guard of the response instruction for the suspicious person. The guard having the PDA 2a thus responds to the current detected suspicious person. The monitoring camera terminal 1a receives from the monitoring camera terminal 1d a reply indicating that a guard is present, and then stops the process.

As described above, even if the suspicious person is detected when no guard is present in the own-terminal monitoring area, among the guards having the PDA 2, the guard in the place (the monitoring area) having the shortest travel time from the own-terminal monitoring area may be issued with the response instruction for the suspicious person. Specifically, the response instruction for the detected suspicious person may be quickly and appropriately issued. Further, the response instruction for the suspicious person may be issued to a guard not manually but automatically, reducing burden on the observer or the like.

A monitoring process according to another example will be described. The above example shows a monitoring process in which the monitoring camera terminal 1 having detected the suspicious person detects the guard having the shortest travel time from the own-terminal monitoring area and issues the response instruction to the guard. This example shows a monitoring process in which the monitoring camera terminal 1 detects the guard having the shortest travel time to the own-terminal and issues the response instruction for the suspicious individual to the guard.

Note that for the travel time between the monitoring areas of two monitoring camera terminals 1, the travel time from the first monitoring camera terminal 1 to the second monitoring camera terminal 1 may be different from the travel time from the second monitoring camera terminal 1 to the first monitoring camera terminal 1 due to stairs or a slope or the like in the path in between.

Figure 13:
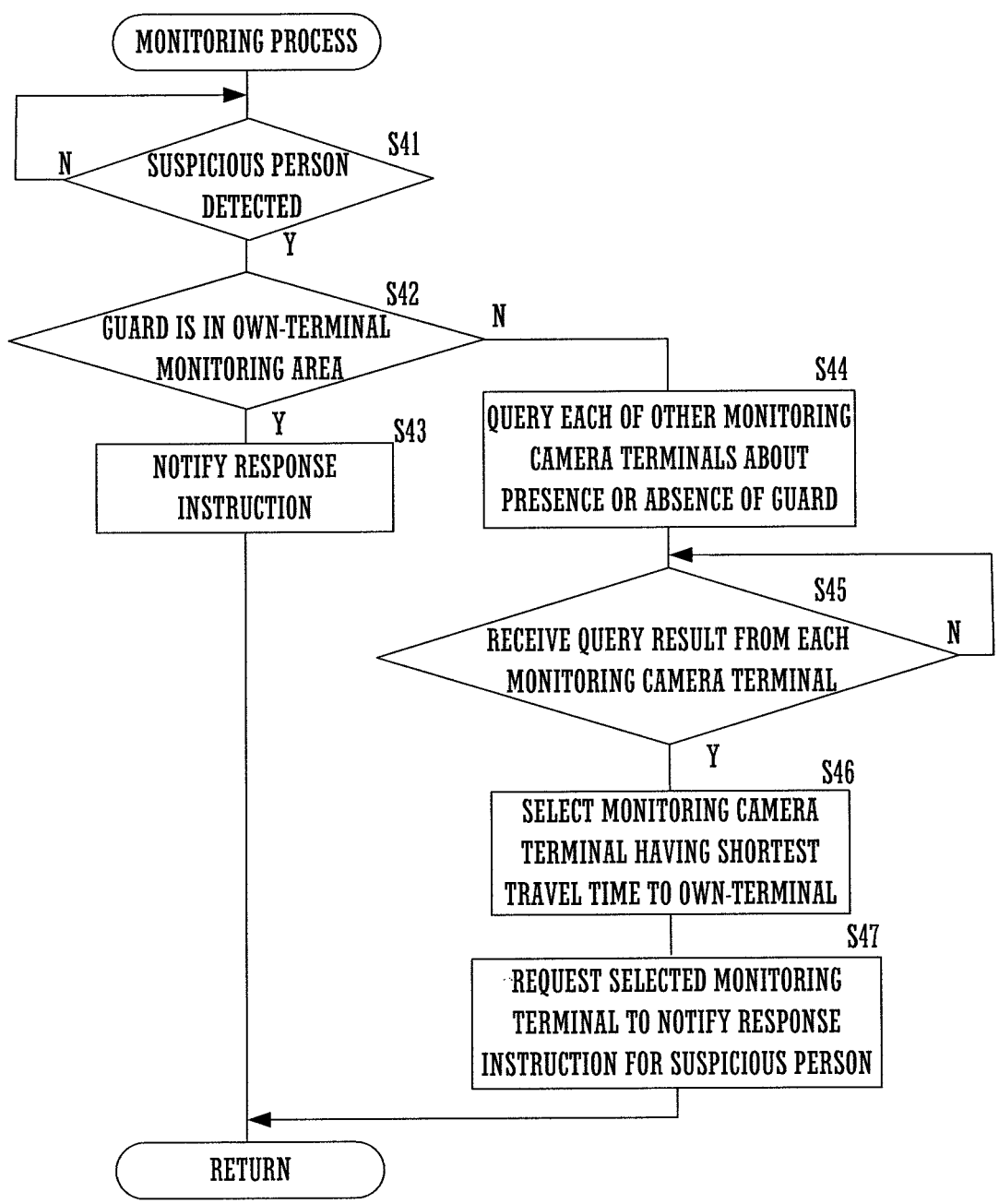
FIG. 13 is a flowchart of another monitoring process.

FIG. 13 is a flowchart of a monitoring process according to this example. The monitoring camera terminal 1 determines the presence or absence of a suspicious person in the monitoring area (S41). If a suspicious person is present, then the monitoring camera terminal 1 determines whether a guard is present in the own-terminal monitoring area (S42). If a guard is present in the own-terminal monitoring area, the monitoring camera terminal 1 notifies the PDA 2 of the guard the response instruction for the current detected suspicious person (S43). Then the process is ended. The processes in S41 to S43 are similar to the above processes S21 to S23, and thus their detailed description is omitted here.

If the monitoring camera terminal 1 having detected the suspicious person determines that no guard is present in the own-terminal monitoring area in S42, then queries each of the other monitoring camera terminals 1 about the presence or absence of a guard (S44). The query in S44 includes the own-terminal ID, but not include the image of the current detected suspicious person.

Figure 14:
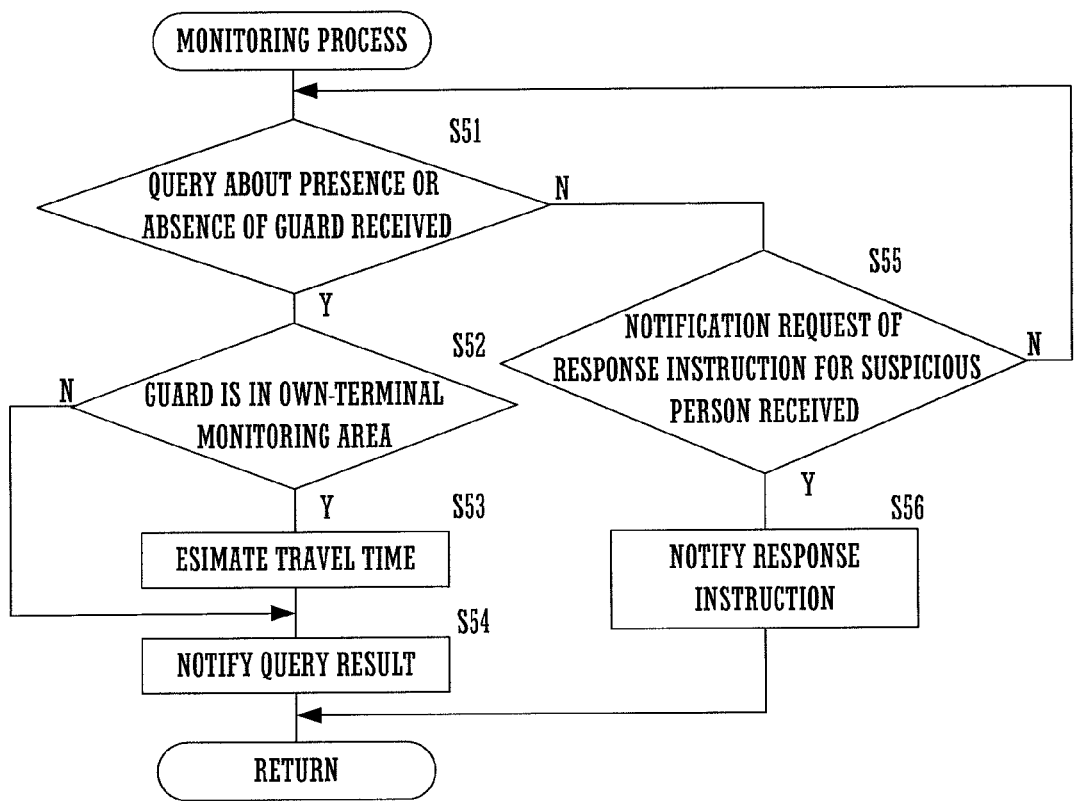
FIG. 14 is a flowchart of another monitoring process.

With reference to FIG. 14, the monitoring camera terminal 1 having received a query in S44 determines whether a guard is present in the own-terminal monitoring area (S51 and S52).

The process in FIG. 14 is performed in parallel with the monitoring process in FIG. 13. The process in S52 is similar to the above process in S42, and thus the detailed description is omitted here. If the monitoring camera terminal 1 having received a query in S44 has a guard in the own-terminal monitoring area, it uses travel time distribution data stored in the own-terminal to estimate the travel time to the monitoring camera terminal 1 having transmitted the query (S53). In S53, in the travel time distribution data stored in the own-terminal including a plurality of time divisions for the current monitoring camera terminal 1 having transmitted the query, the time division having the maximum element value is determined as the travel time to that monitoring camera terminal 1.

The monitoring camera terminal 1 having received a query in S44 returns a query result including the presence or absence of a guard in the own-terminal monitoring area and, if a guard is present, the travel time estimated in S53 (S54).

With reference to the above FIG. 10, it is assumed here, for example, that the monitoring camera terminal 1a detects the suspicious person in the monitoring area when guards having the PDA 2 are present in the monitoring area of the monitoring camera terminal 1d and the monitoring area of the monitoring camera terminal 1e. The following is also assumed. The monitoring camera terminal 1d stores travel time distribution data indicating the travel time of 70 to 90 s to the monitoring area of the monitoring camera terminal 1a. Also, the monitoring camera terminal 1e stores travel time distribution data indicating the travel time of 50 to 70 s to the monitoring area of the monitoring camera terminal 1a. In this case, the monitoring camera terminal 1a having issued a query in S44 receives a query result from the monitoring camera terminals 1b and 1c indicating no guard in the monitoring area. The monitoring camera terminal 1a also receives a query result from the monitoring camera terminal 1d indicating a guard in the monitoring area and a travel time of 70 to 90 s. The monitoring camera terminal 1a also receives a query result from the monitoring camera terminal 1e indicating a guard in the monitoring area and a travel time of 50 to 70 s.

When the current monitoring camera terminal 1 having issued a query in S44 (the current monitoring camera terminal 1 having detected the suspicious person) receives query results from the other monitoring camera terminals 1 (S45), it selects, among the monitoring camera terminals 1 that have detected a guard, the monitoring camera terminal 1 having notified the shortest travel time to the own-terminal monitoring area (S46). In the above example, the monitoring camera terminal 1e is selected in S46.

The current monitoring camera terminal 1 having detected the suspicious person requests the monitoring camera terminal 1 selected in S46 to notify the guard in the monitoring area of that terminal of the response instruction for the suspicious person (S47). This notification includes the own-terminal ID and the face image of the current detected suspicious person.

With reference to FIG. 14, when the monitoring camera terminal 1 receives the notification request for the response instruction for the suspicious person in S47 from the other monitoring camera terminals 1, it transmits the information included in the notification request to the PDA 2 of the guard in the own-terminal monitoring area (S55 and S56). The information includes the face image of the suspicious person and the monitoring area in which the suspicious person is present.

As described above, even if the suspicious person is detected when no guard is present in the own-terminal monitoring area, among the guards having the PDA 2, the guard in the place (the monitoring area) having the shortest travel time to the own-terminal monitoring area may be issued with the response instruction for the suspicious person. Specifically, the response instruction for the detected suspicious person may be quickly and more appropriately issued. Further, the response instruction for the suspicious person may be issued to a guard not manually but automatically, reducing burden on the observer or the like.

A monitoring process according to still another example will be described. In this example, a response instruction taking into account the travel of the detected suspicious person is issued to a guard.

Figure 15:
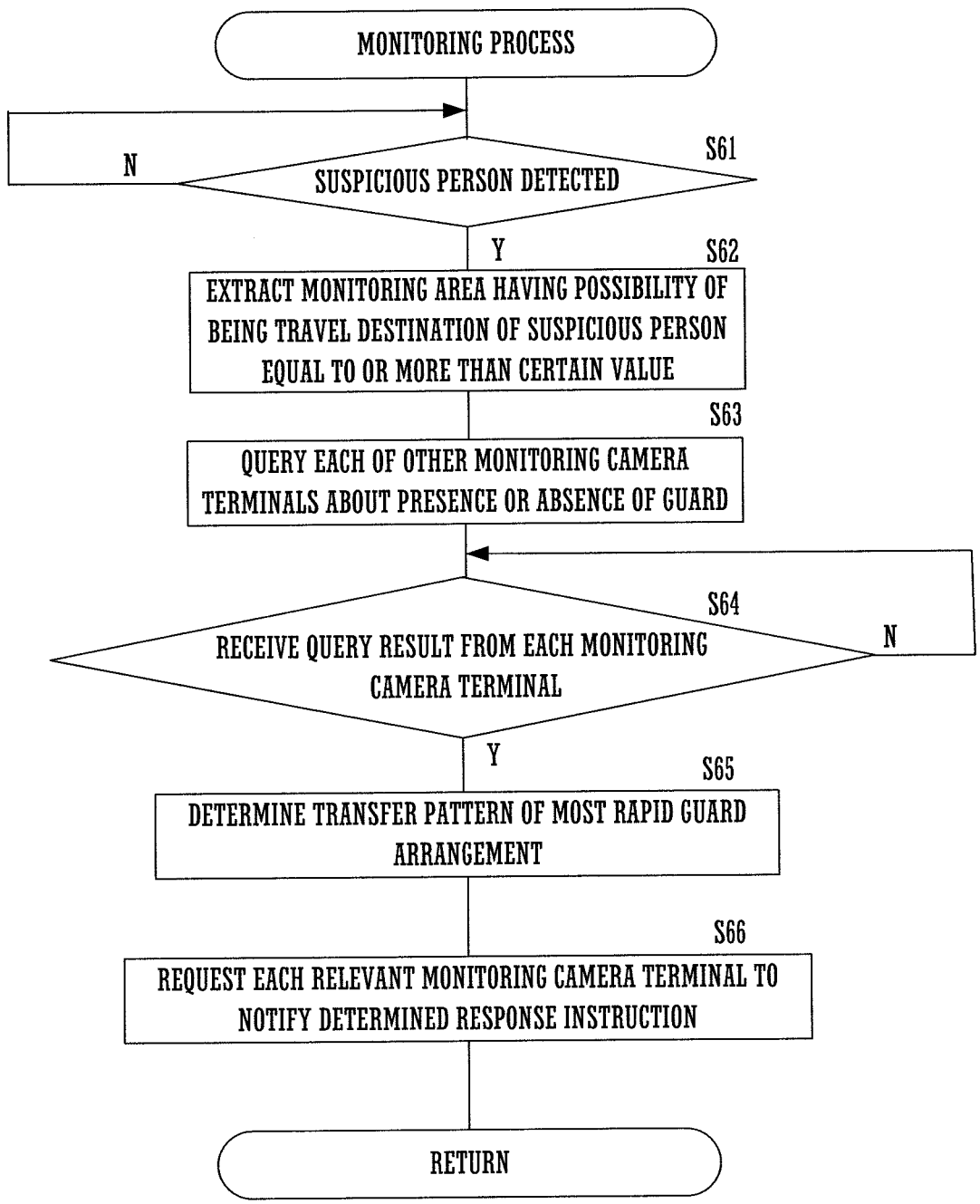
FIG. 15 is a flowchart of another monitoring process.

FIG. 15 is a flowchart of the monitoring process. The monitoring camera terminal 1 determines the presence or absence of the suspicious person in the monitoring area (S61). If any suspicious person is present, then the monitoring camera terminal 1 extracts a monitoring area having a certain possibility that the suspicious person is detected after a predetermined time (here, 30 to 50 s) has elapsed, the certain possibility being equal to or more than a predetermined value (here, 25%) (S62). In S62, travel time distribution data stored in the own-terminal storage portion 14 is used to extract the relevant monitoring area. Specifically, for the total sum of all element values of the time division corresponding to a predetermined time, the monitoring area is extracted in which the element value of the time division exceeds 25%. It is assumed, for example, that the monitoring camera terminal 1a having detected the suspicious person stores travel time distribution data shown in the above FIG. 11. In this travel time distribution data, the total sum of all element values in the time division after 30 to 50 s has elapsed is 50 (17+9+19+5+0). Therefore, the monitoring camera terminals 1 having an element value more than 12.5 in this time division (the monitoring camera terminal 1a and the monitoring camera terminal 1c) are selected in S62.

The current monitoring camera terminal 1 having detected the suspicious person queries each of the other monitoring camera terminals 1 about the presence or absence of a guard (S63). The query in S63 includes the ID of the own-terminal as the query source terminal. The query also includes the ID of the monitoring camera terminal 1 extracted in S62 as the terminal of which the travel time is queried. In the above example, the query includes the ID of the monitoring camera terminal 1a as the query source terminal, and also includes the IDs of the monitoring camera terminal 1a and the monitoring camera terminal 1c as the terminals of which the travel time is queried.

Figure 16:
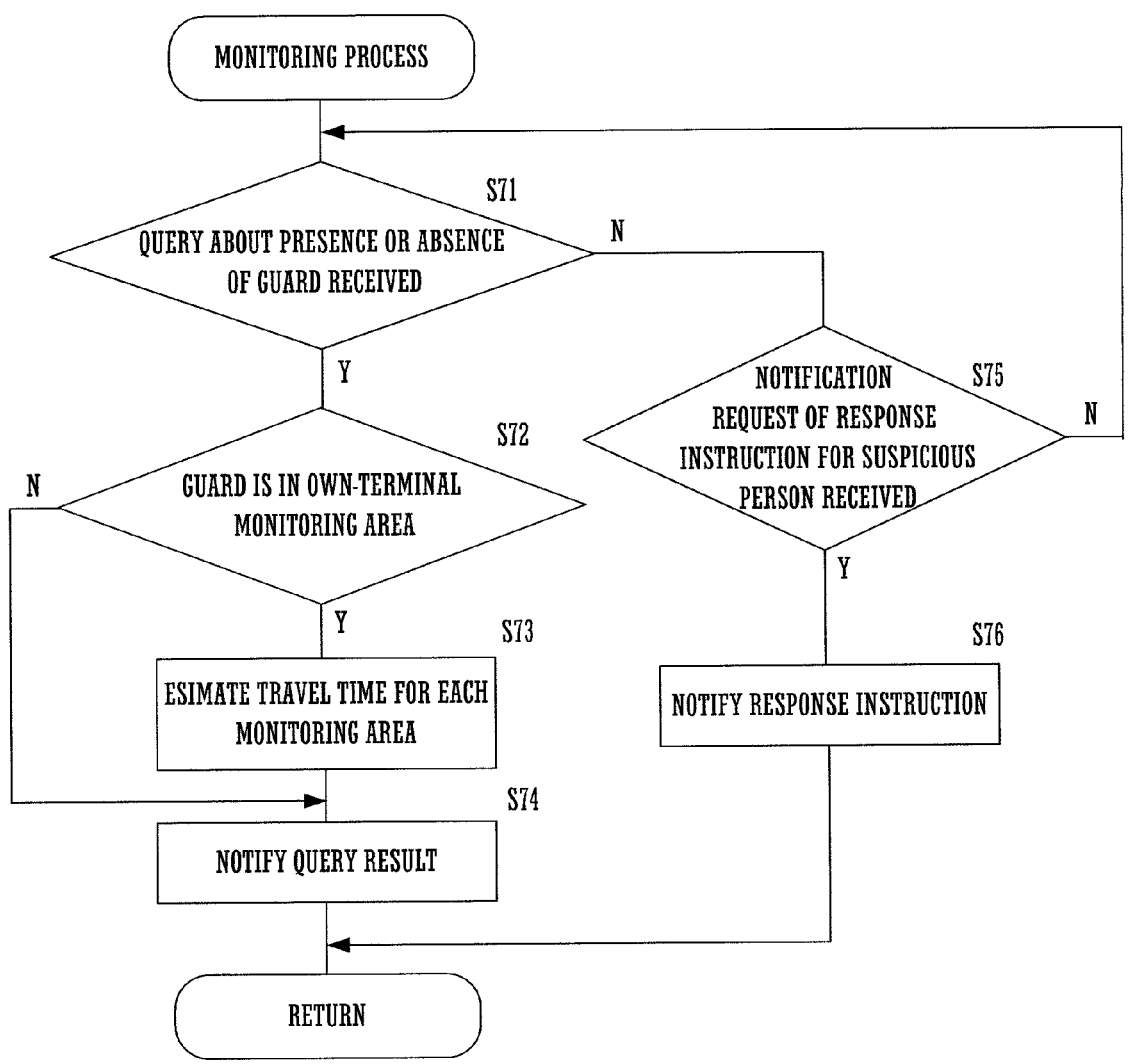
FIG. 16 is a flowchart of another monitoring process.

With reference to FIG. 16, the monitoring camera terminal 1 having received a query in S63 determines whether a guard is present in the own-terminal monitoring area (S71 and S72). The process in FIG. 16 is performed in parallel with the monitoring process in FIG. 15. The process in S72 is similar to the above process in S42, and thus the detailed description is omitted here. If the monitoring camera terminal 1 having received a query in S63 has a guard in the own-terminal monitoring area, it uses travel time distribution data stored in the own-terminal to estimate the travel time from the own-terminal monitoring area to each terminal of which the travel time is queried in the query, (S73). In S73, for each terminal of which the travel time is queried in the current query, the time division whose element value is the maximum in the travel time distribution data stored in the own-terminal is estimated as the travel time.

The monitoring camera terminal 1 having received a query in S63 returns a query result including the presence or absence of a guard in the own-terminal monitoring area and, if a guard is present, the travel time to each terminal estimated in S73 (S74).

With reference to the above FIG. 10, it is assumed here, for example, that the monitoring camera terminal 1a detects the suspicious person in the monitoring area when guards having the PDA 2 are present in the monitoring area of the monitoring camera terminal 1d and the monitoring area of the monitoring camera terminal 1e. The monitoring camera terminal 1d stores travel time distribution data indicating the travel time of 70 to 90 s to the monitoring area of the monitoring camera terminal 1a and the travel time of 10 to 30 to the monitoring camera terminal 1c. The monitoring camera terminal 1e stores travel time distribution data indicating the travel time of 50 to 70 s to the monitoring area of the monitoring camera terminal 1a and the travel time of 10 to 30 to the monitoring camera terminal 1c. In this case, the monitoring camera terminal 1a having issued the query in S63 receives from each of the monitoring camera terminals 1b and 1c a query result indicating that no guard is in the monitoring area. The monitoring camera terminal 1a also receives a query result from the monitoring camera terminal 1d, the query result indicating a guard in its monitoring area, the travel time of 70 to 90 s to the monitoring area of the monitoring camera terminal 1a, and the travel time of 10 to 30 to the monitoring camera terminal 1c. The monitoring camera terminal 1a also receives a query result from the monitoring camera terminal 1e, the query result indicating a guard in its monitoring area, the travel time of 50 to 70 s to the monitoring area of the monitoring camera terminal 1a, and the travel time of 10 to 30 to the monitoring camera terminal 1c.

When the current monitoring camera terminal 1 having issued a query in S63 (the current monitoring camera terminal 1 having detected the suspicious person) receives query results from the other monitoring camera terminals 1 (S64), it determines a guard transfer pattern in which the guards may be most rapidly transferred to the monitoring areas of the monitoring camera terminals 1 extracted in S62 (S65).

In the above example, the guard in the monitoring area of the monitoring camera terminal 1d has a travel time of 70 to 90 s to the monitoring area of the monitoring camera terminal 1a and a travel time of 10 to 30 to the monitoring camera terminal 1c. The guard in the monitoring area of the monitoring camera terminal 1e has a travel time of 50 to 70 s to the monitoring area of the monitoring camera terminal 1a and a travel time of 10 to 30 to the monitoring camera terminal 1c. The guard transfer completes in 70 to 90 s in a transfer pattern in which the guard in the monitoring area of the monitoring camera terminal 1d is transferred to the monitoring area of the monitoring camera terminal 1a, and the guard in the monitoring area of the monitoring camera terminal 1e is transferred to the monitoring area of the monitoring camera terminal 1c. The guard transfer completes in 50 to 70 s in a transfer pattern in which the guard in the monitoring area of the monitoring camera terminal 1e is transferred to the monitoring area of the monitoring camera terminal 1a, and the guard in the monitoring area of the monitoring camera terminal 1d is transferred to the monitoring area of the monitoring camera terminal 1c. Therefore, in this case, a transfer pattern is selected in S65 in which the guard in the monitoring area of the monitoring camera terminal 1e is transferred to the monitoring area of the monitoring camera terminal 1a, and the guard in the monitoring area of the monitoring camera terminal 1d is transferred to the monitoring area of the monitoring camera terminal 1c.

The monitoring camera terminal 1 uses the guard transfer pattern determined in S65 to request the monitoring camera terminal 1 allocated with the monitoring area where the guard to be transferred is present to notify the response instruction for the suspicious person (S66). This notification includes the face image of the current detected suspicious person and the ID of the monitoring camera terminal 1 allocated with the monitoring area to which the guard is instructed to travel or the like. In the above example, the monitoring camera terminal 1a instructs the monitoring camera terminal 1d to transfer the guard to the monitoring area of the monitoring camera terminal 1c, and instructs the monitoring camera terminal 1e to transfer the guard to the monitoring area of the monitoring camera terminal 1a.

With reference to FIG. 16, when the monitoring camera terminal 1 receives a notification request for the response instruction for the suspicious person from the other monitoring camera terminals 1 in S66, it transmits the face image of the suspicious person and the ID of the monitoring camera terminal 1 allocated with the monitoring area as the transfer destination included in the notification request to the PDA 2 of the guard in the own-terminal monitoring area (S75 and S76).

As described above, if a suspicious person is detected, a response instruction taking into account the travel of the suspicious person may be issued to a guard.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

EXPLANATION OF REFERENCE NUMBERS

1 Monitoring Camera Terminal
2 Personal Digital Assistance (PDA)
11 Control Portion
12 Imaging Portion
13 Image Processing Portion
14 Storage Portion
15 Timer
16 Communication Portion

The invention claimed is:

1. A monitoring system comprising a plurality of monitoring terminals communicably connected to each other, each monitoring terminal comprising:
  an imaging portion for imaging a monitoring area allocated to an own-terminal;
  a tracing portion for processing an imaged image of the imaging portion and tracing a target person traveling in the monitoring area;
  a tracing information creation portion for creating tracing information associating the target person traced by the tracing portion with tracing start time, tracing stop time, and characteristic information of the target person;
  a tracing information storage portion for storing the tracing information created by the tracing information creation portion;
  a tracing information notification portion for notifying the tracing information created by the tracing information creation portion to the other monitoring terminals; and
  a travel time distribution data generation portion for using the tracing information stored in the tracing information storage portion and the tracing information notified from the other monitoring terminals to generate travel time distribution data that aggregates distributions of the target person's travel time from the own-terminal monitoring area to the monitoring area of each monitoring terminal, the travel time distribution data generation portion using, for each tracing information notified from each monitoring terminal, the characteristic information of the target person included in the notified tracing information to search whether the tracing information storage portion stores the tracing information of a person who is relevant to the target person, the travel time distribution data generation portion calculating, if the tracing information of the relevant target person is searched out, a first travel time as a time difference between the tracing stop time of the current searched-out tracing information and the tracing start time of the notified tracing information, and a second travel time as a time difference between the tracing start time of the current searched-out tracing information and the tracing stop time of the notified tracing information, and the travel time distribution data generation portion generating travel time distribution data that aggregates distributions of the time width from the first travel time to the second travel time thus calculated.

2. The monitoring system according to claim 1, wherein each monitoring terminal further comprises:
a determination portion for determining the presence or absence of the monitoring target person in the own-terminal monitoring area;
a registrant position detection portion for detecting, if the determination portion determines that the monitoring target person is present in the own-terminal monitoring area, a position of a registrant having a personal digital assistance; and
a response instruction output portion for outputting a response instruction for the monitoring target person in the own-terminal monitoring area to the personal digital assistance of the registrant detected by the registrant detection portion.

3. The monitoring system according to claim 2, wherein each monitoring terminal further comprises a monitoring target person information storage portion for storing monitoring target person information associated with a facial feature amount of each monitoring target person, and
the determination portion processes the imaged image of the imaging portion, verifies the facial feature amount of the imaged person with the facial feature amount of the monitoring target person stored in the monitoring target person information storage portion, and uses the verification result to determine the presence or absence of the monitoring target person in the own-terminal monitoring area.

4. The monitoring system according to claim 2, wherein each monitoring terminal further comprises:
a registrant information storage portion for storing registrant information associated with a facial feature amount of each registrant; and
a registrant detection portion for processing the imaged image of the imaging portion, verifying the facial feature amount of the imaged person with the facial feature amount of the registrant stored in the registrant information storage portion, and detecting the presence or absence of the registrant in the own-terminal monitoring area, and
wherein the registrant position detection portion queries the other monitoring terminals about the presence or absence of the registrant in the monitoring area.

5. The monitoring system according to claim 2, wherein the response instruction output portion outputs the response instruction for the monitoring target person in the own-terminal monitoring area to the personal digital assistance of the registrant at a position having the shortest travel time from the own-terminal monitoring area, the travel time being estimated using the travel time distribution data created by the travel time distribution data creation portion.

6. The monitoring system according to claim 4,
wherein each monitoring terminal further comprises a travel time notification portion for notifying, if it receives from the other monitoring terminals a query about the presence or absence of the registrant in the own-terminal monitoring area and the registrant is present in the own-terminal monitoring area, the travel time from the own-terminal monitoring area to the monitoring area of the current querying monitoring terminal, the travel time being estimated using the travel time distribution data created by the travel time distribution data creation portion, and
wherein in response to the notification from the other monitoring terminals by the travel time notification portion, the response instruction output portion outputs the response instruction for the monitoring target person in the own-terminal monitoring area to the personal digital assistance of the registrant at a position having the shortest travel time to the own-terminal monitoring area.

7. The monitoring system according to claims 2,
wherein each monitoring terminal further comprises a travel destination estimation portion for estimating the travel destination of the monitoring target person determined to be in the own-terminal monitoring area by the determination portion using the travel time distribution data created by the travel time distribution data creation portion, and
wherein the response instruction output portion instructs the personal digital assistance of the registrant detected by the registrant detection portion to travel to the travel destination of the monitoring target person estimated by the travel destination estimation portion.

8. A monitoring terminal communicably connected to other monitoring terminals, comprising:
an imaging portion for imaging the monitoring area allocated to the own-terminal;
a tracing portion for processing the imaged image of the imaging portion and tracing the target person traveling in the monitoring area;
a tracing information creation portion for creating tracing information associating the target person traced by the tracing portion with the tracing start time, the tracing stop time, and the characteristic information of the target person;
a tracing information storage portion for storing the tracing information created by the tracing information creation portion;
a tracing information notification portion for notifying the tracing information created by the tracing information creation portion to the other monitoring terminals; and
a travel time distribution data generation portion for using the tracing information stored in the tracing information storage portion and the tracing information notified from the other monitoring terminals to generate travel time distribution data that aggregates distributions of the target person's travel time from the own-terminal monitoring area to the monitoring area of each monitoring terminal,
the travel time distribution data generation portion using, for each tracing information notified from each monitoring terminal, the characteristic information of the target person included in the notified tracing information to search whether the tracing information storage portion stores the tracing information of a person who is relevant to the target person, the travel time distribution data generation portion calculating, if the tracing information of the relevant target person is searched out, a first travel time as a time difference between the tracing stop time of the current searched-out tracing information and the tracing start time of the notified tracing information, and a second travel time as a time difference between the tracing start time of the current searched-out tracing information and the tracing stop time of the notified tracing information, and the travel time distribution data generation portion generating travel time distribution data that aggregates distributions of the time width from the first travel time to the second travel time thus calculated.

* * * * *